US012381059B2

(12) United States Patent
Li et al.

(10) Patent No.: US 12,381,059 B2
(45) Date of Patent: Aug. 5, 2025

(54) EXTENSION HANDLE ASSEMBLY FOR MOTOR PROTECTIVE CIRCUIT BREAKER AND MOTOR PROTECTIVE CIRCUIT BREAKER

(71) Applicant: Schneider Electric Industries SAS, Rueil-Malmaison (FR)

(72) Inventors: Shaofan Li, Shanghai (CN); Sile Hu, Shanghai (CN)

(73) Assignee: Schneider Electronics Industries SAS, Rueil-Malmaison (FR)

( * ) Notice: Subject to any disclaimer, the term of this patent is extended or adjusted under 35 U.S.C. 154(b) by 226 days.

(21) Appl. No.: 18/215,398

(22) Filed: Jun. 28, 2023

(65) Prior Publication Data

US 2024/0006141 A1 Jan. 4, 2024

(30) Foreign Application Priority Data

Jul. 1, 2022 (CN) ......................... 202210774737.3

(51) Int. Cl.
*H01H 71/12* (2006.01)
*H01H 71/02* (2006.01)
*H01H 71/70* (2006.01)

(52) U.S. Cl.
CPC ...... *H01H 71/128* (2013.01); *H01H 71/0264* (2013.01); *H01H 71/70* (2013.01)

(58) Field of Classification Search
CPC ....... H01H 2071/10; H01H 2071/1054; H01H 2071/50; H01H 2071/508; H01H 2071/56; H01H 2071/565; H01H 2221/00; H01H 2221/01; H01H 2221/016; H01H 2221/07; H01H 2221/078; H01H 2221/08; H01H 2221/082; H01H 9/00; H01H 9/02; H01H 9/06; H01H 9/24; H01H 2003/022; H01H 2003/0286; H01H 2003/2009; H01H 2003/02; H01H 2003/0285; H01H 2003/06; H01H 3/00; H01H 3/04; H01H 3/06; H01H 71/00; H01H 71/02; H01H 71/0264; H01H 71/10; H01H 71/12; H01H 71/128;
(Continued)

(56) References Cited

U.S. PATENT DOCUMENTS

| | | | | |
|---|---|---|---|---|
| 4,506,121 A * | 3/1985 | Peterson | H01R 13/707 | 200/50.28 |
| 5,288,958 A * | 2/1994 | Grunert | H01H 9/22 | 200/43.14 |

FOREIGN PATENT DOCUMENTS

KR 200440107 Y1 * 12/2006 ............ H01H 21/22

* cited by examiner

*Primary Examiner* — Anthony R Jimenez
(74) *Attorney, Agent, or Firm* — Troutman Pepper Locke LLP

(57) ABSTRACT

An extension handle assembly includes: a housing; a handle driving the knob to rotate from a first position to a second position during a manual tripping period of a motor protection circuit breaker and drives the handle to rotate from the first position to a third position during a fault tripping; a stopper configured to abut against the handle upon the handle rotating from the first position to the second position during the manual tripping period, to provide a stopping force for a rotation of the handle to increase a force required for the rotation of the handle from the first position to the second position; and configured not to abut against the handle upon the handle rotating from the first position to the third position during the fault tripping period, not to provide a stopping force for the rotation of the handle.

10 Claims, 6 Drawing Sheets

(58) Field of Classification Search
CPC .... H01H 71/52; H01H 71/521; H01H 71/522; H01H 71/526; H01H 71/70
USPC ....................................................... 200/43.14
See application file for complete search history.

EXTENSION HANDLE ASSEMBLY FOR MOTOR PROTECTIVE CIRCUIT BREAKER AND MOTOR PROTECTIVE CIRCUIT BREAKER

TECHNICAL FIELD

The present disclosure relates to an extension handle assembly for a motor protection circuit breaker and a motor protection circuit breaker comprising the extension handle assembly.

BACKGROUND

Motor protection circuit breaker generally has three states: ON state, fault tripping state and manual tripping state. Generally speaking, the motor protection circuit breaker includes a knob, and based on the above three states of the motor protection circuit breaker, the knob has three corresponding rotation positions: a first position, a third position and a second position, and the third position is located between the first position and the second position. For example, upon the motor protection circuit breaker being switched from the ON state to the manual tripping state, the knob is rotated by 90 degrees from the first position to the second position, and upon the motor protection circuit breaker being switched from the ON state to the fault tripping state, the knob is rotated by 45 degrees from the first position to the third position.

In the existing art, an extension handle assembly for the motor protection circuit breaker is also provided, and the knob of the motor protection circuit breaker can be controlled to move between the first position, the second position and the third position through the extension handle assembly. However, there are cases where the motor protection circuit breaker is controlled to switch from the ON state to the manual tripping state due to accidental misoperation of the extension handle assembly. Because the switch of the motor protection circuit breaker from the ON state to the manual tripping state is unexpected, it is desirable to increase the force required by using the extension handle assembly to control the switch of the motor protection circuit breaker from the ON state to the manual tripping state, so as to reduce the occurrence of accidental switch and not hinder the switch of the motor protection circuit breaker from the ON state to the fault tripping state.

SUMMARY

Therefore, the present disclosure provides an extension handle assembly for a motor protection circuit breaker, the extension handle assembly is installed on the motor protection circuit breaker, and includes: a housing; a handle, installed to the housing, the handle is installed to a knob of the motor protection circuit breaker upon the extension handle assembly being installed to the motor protection circuit breaker, the handle is configured to drive the knob of the motor protection circuit breaker to rotate together upon the motor protection circuit breaker being manually tripped, and to rotate together with the knob of the motor protection circuit breaker upon the motor protection circuit breaker being fault-tripped; during a manual tripping period of the motor protection circuit breaker, the handle drives the knob to rotate from a first position to a second position, during a fault tripping of the motor protection circuit breaker, the knob drives the handle to rotate from the first position to a third position, the third position is located between the first position and the second position, at the first position, the motor protection circuit breaker is in an ON state, at the second position, the motor protection circuit breaker is in the manual tripping state, and at the third position, the motor protection circuit breaker is in the fault tripping state; a stopper, pivotally installed in the housing, wherein the stopper is configured to abut against the handle upon the handle rotating from the first position to the second position during the manual tripping period of the motor protection circuit breaker, so as to provide a stopping force for a rotation of the handle to increase a force required for the rotation of the handle from the first position to the second position, and the stopper is configured not to abut against the handle upon the handle rotating from the first position to the third position during the fault tripping period of the motor protection circuit breaker, so as not to provide a stopping force for the rotation of the handle.

Preferably, the stopper includes a pivot shaft, a main body and a first stop part, and the pivot shaft is installed to the housing so that the stopper pivots around the pivot shaft, and the first stop part protrudes from the main body and is configured to abut against the handle.

Preferably, upon the handle rotating from the first position to the second position during the manual tripping period of the motor protection circuit breaker, the handle is configured to abut against the first stop part of the stopper, so that the first stop part provides the stopping force to the rotation of the handle and is pushed by the handle to pivot away from a rotation path of the handle.

Preferably, further including a return spring arranged between the stopper and the housing for providing a return force for the stopper to return after the stopper is pushed by the handle to pivot away from the rotation path of the handle.

Preferably, further including a biasing member connected between the handle and the housing, wherein the biasing member is configured to provide a biasing force to rotate the handle toward the second position or the third position at the first position of the handle.

Preferably, the biasing member is a tension spring, one end of the tension spring is fixedly installed on the housing, and the other end of the tension spring is fixedly installed on the handle.

Preferably, the knob of the motor protection circuit breaker is spaced apart from the handle by a predetermined angle in a rotation direction of the knob of the motor protection circuit breaker during the fault tripping period of the motor protection circuit breaker.

Preferably, the stopper further includes a second stop part protruding from the main body and configured to abut against the knob of the motor protection circuit breaker.

Preferably, during the fault tripping period of the motor protection circuit breaker, the knob of the motor protection circuit breaker is configured to first rotate by a predetermined angle and abut against the second stop part of the stopper to push the stopper to pivot away from the rotation path of the handle, and then the knob abuts against the handle to drive the handle to rotate together.

The present disclosure also provides a motor protection circuit breaker comprising the extension handle assembly as mentioned above.

BRIEF DESCRIPTION OF DRAWINGS

Advantages and objectives of the present disclosure can be better understood from the following detailed description of preferred embodiments of the present disclosure in conjunction with the accompanying drawings. The drawings are not drawn to scale in order to better show the relationship between the components in the drawings. In the attached drawings.

DETAILED DESCRIPTION

Figure 1:
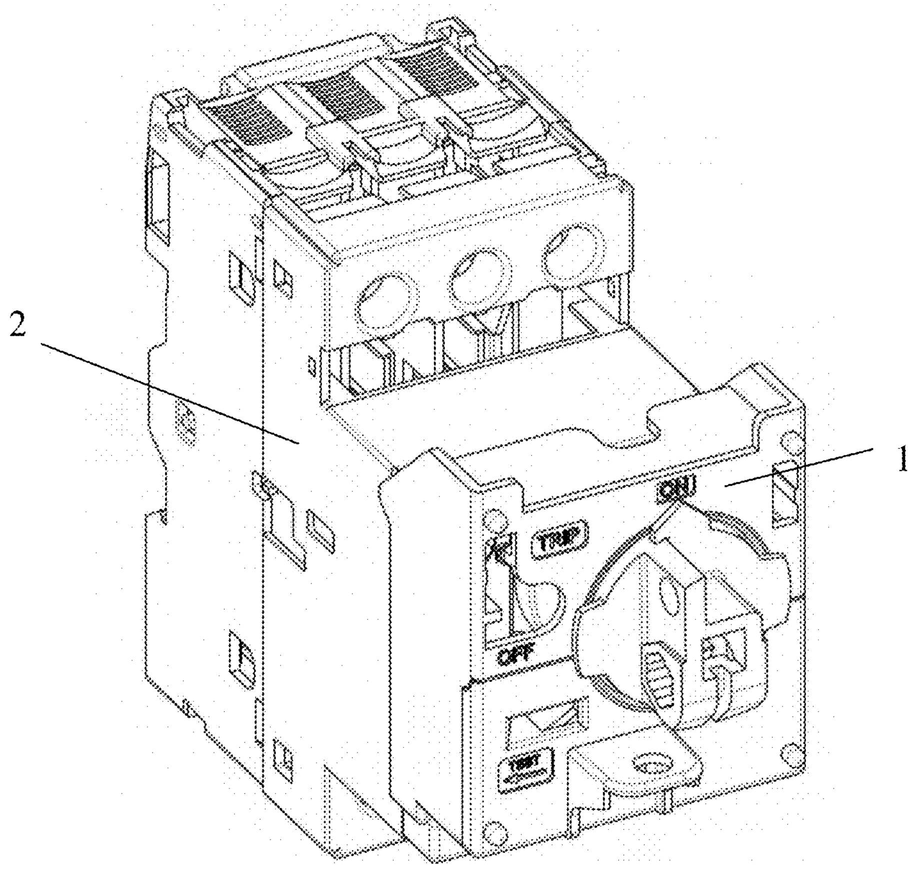
FIG. 1 shows an external view of an extension handle assembly according to the present disclosure installed to a motor protection circuit breaker.

Various embodiments according to the present disclosure will be described in detail with reference to the accompanying drawings. Herein, it should be noted that, in the drawings, the same reference numerals are given to components having basically the same or similar structures and functions, and repeated descriptions about them will be omitted. The term "sequentially including A, B, C, etc." only indicates the arrangement order of included components A, B, C, etc., and does not exclude the possibility of including other components between A and B and/or between B and C. The description of "first" and its variants is only for distinguishing the components, and does not limit the scope of the invention. Without departing from the scope of the invention, "first component" can be written as "second component" and so on.

The attached drawings in the present description are schematic diagrams to help explain the concept of the present disclosure, and schematically show the shapes of various parts and their relationships.

Hereinafter, with reference to FIGS. 1 to 11, preferred embodiments according to the present disclosure will be described in detail.

Figure 2:
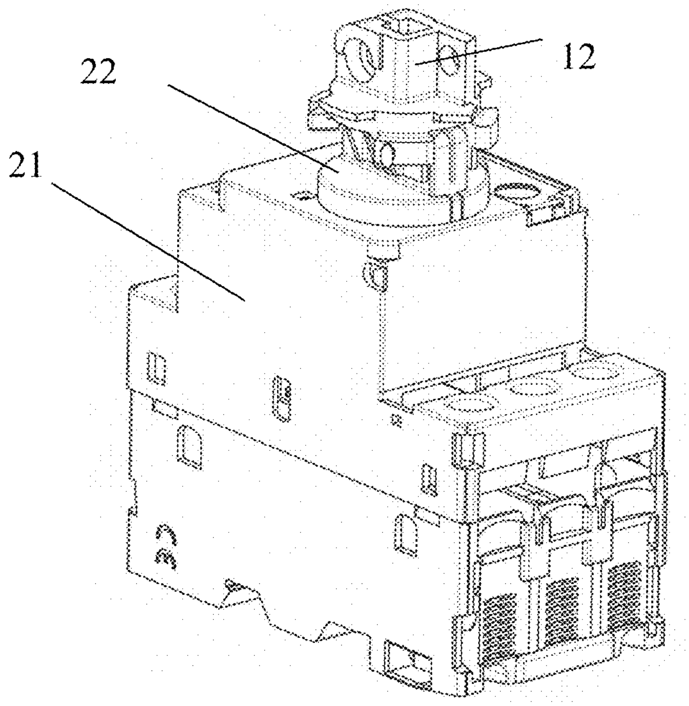
FIG. 2 shows the external view of FIG. 1, with a housing of the extension handle assembly removed for clarity to show that a handle of the extension handle assembly is installed to a knob of the motor protection circuit breaker.

FIGS. 1 and 2 show perspective views of an extension handle assembly 1 according to the present disclosure installed to a motor protection circuit breaker 2. The extension handle assembly 1 includes a housing 11 and a handle 12, and the motor protection circuit breaker 2 includes a housing 21 and a knob 22. Upon the extension handle assembly being installed to the motor protection circuit breaker 2, the housing 11 of the extension handle assembly is installed to the housing 21 of the motor protection circuit breaker 2, and the handle 12 of the extension handle assembly 1 is installed to the knob 22 of the motor protection circuit breaker 2. It should be noted that the specific way of installing the housing of the extension handle assembly 1 to the housing of the motor protection circuit breaker 2 is well known to those skilled in the art, and has nothing to do with the purpose of the present disclosure, so the repeated portions will be omitted here, and those skilled in the art can choose an appropriate way to install the two housings together. Similarly, the specific way of installing the handle 12 of the extension handle assembly 1 to the knob 22 of the motor protection circuit breaker 2 is well known to those skilled in the art, as long as the handle and knob can be installed together so that they can finally rotate together. For example, the handle 12 of the extension handle assembly may include a groove, a part of the knob 22 of the motor protection circuit breaker can be inserted into the groove, so that the handle 12 is installed to the knob 22.

Figure 3:
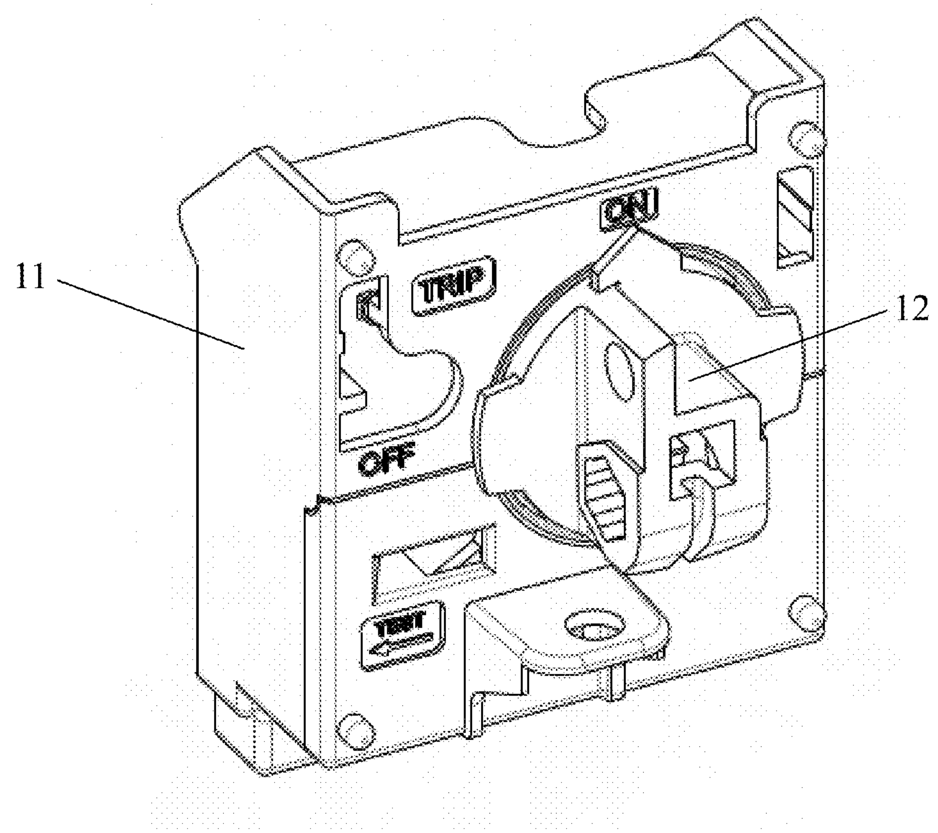
FIG. 3 shows an external view of an extension handle assembly according to the present disclosure.

FIG. 3 shows a perspective view of an extension handle assembly 1 according to the present disclosure. The handle 22 is installed to the housing, and a part of the handle 22 can protrude to the outside of the housing through an opening of the housing, so that a user can directly operate the handle or operate the handle with other operating members.

Figure 4:
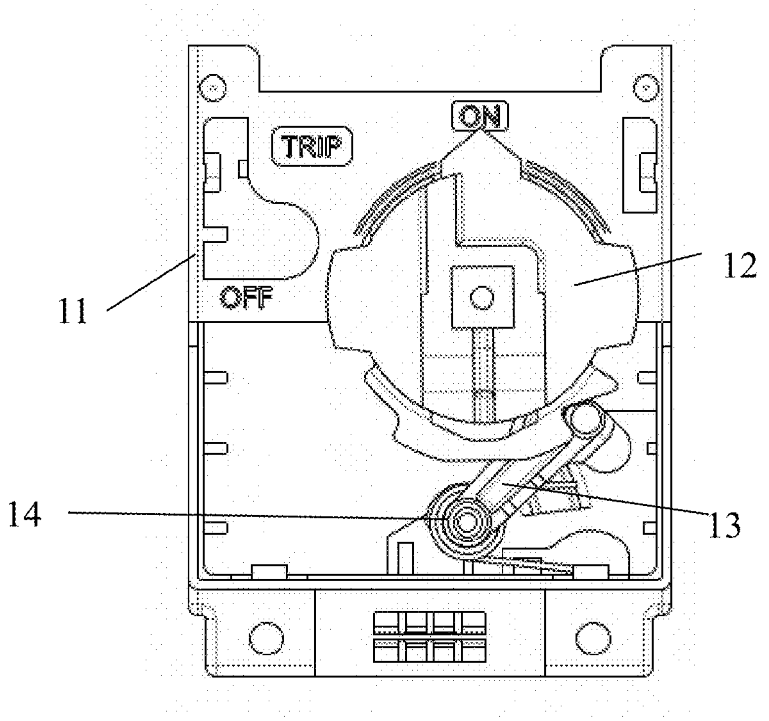
FIG. 4 shows a front view of an extension handle assembly according to the present disclosure, showing its internal structure. In this case, the handle of the extension handle assembly is at the first position, and the motor protection circuit breaker is in an ON state.
Figure 5:
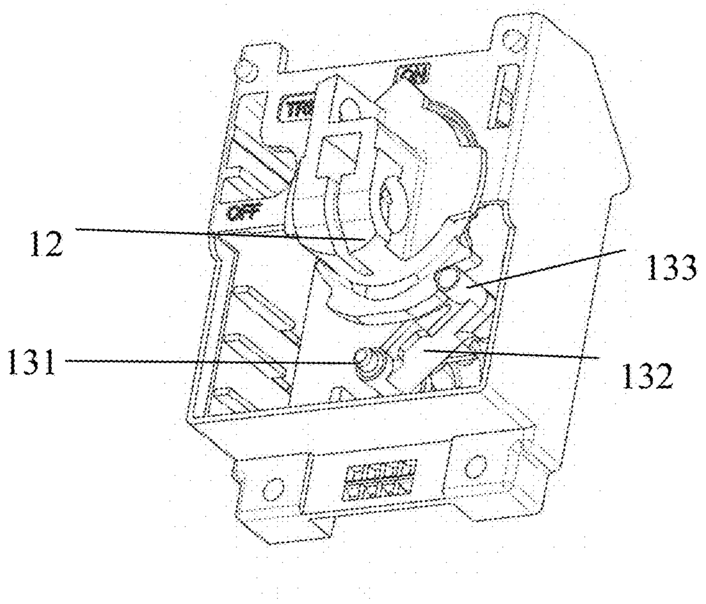
FIG. 5 shows a perspective view of the extension handle assembly of FIG. 4.
Figure 6:
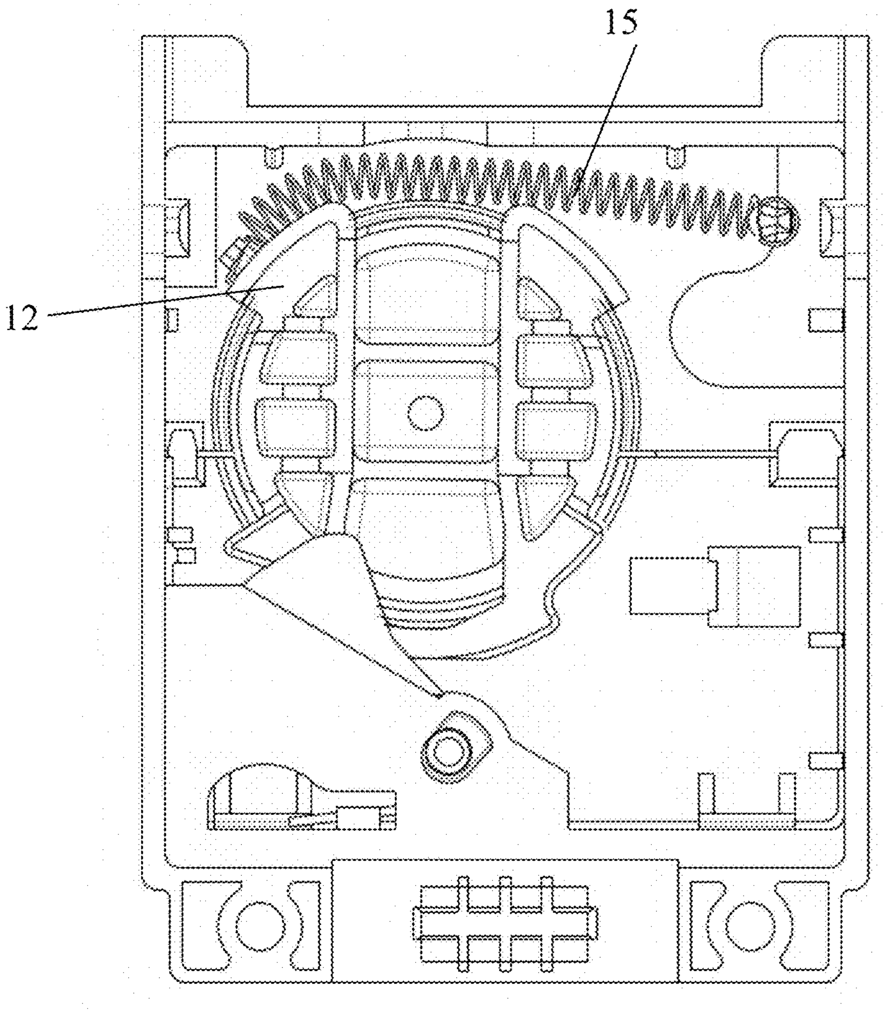
FIG. 6 shows a rear view of the extension handle assembly of FIG. 4.
Figure 7:
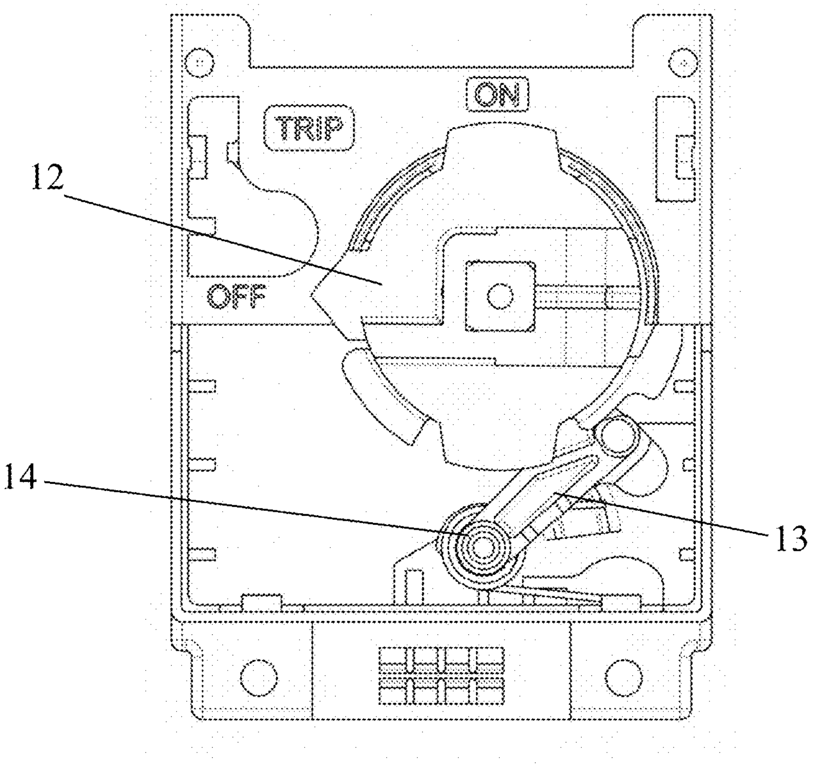
FIG. 7 shows a front view of the handle of the extension handle assembly rotating from a first position to a second position during a manual tripping period.
Figure 8:
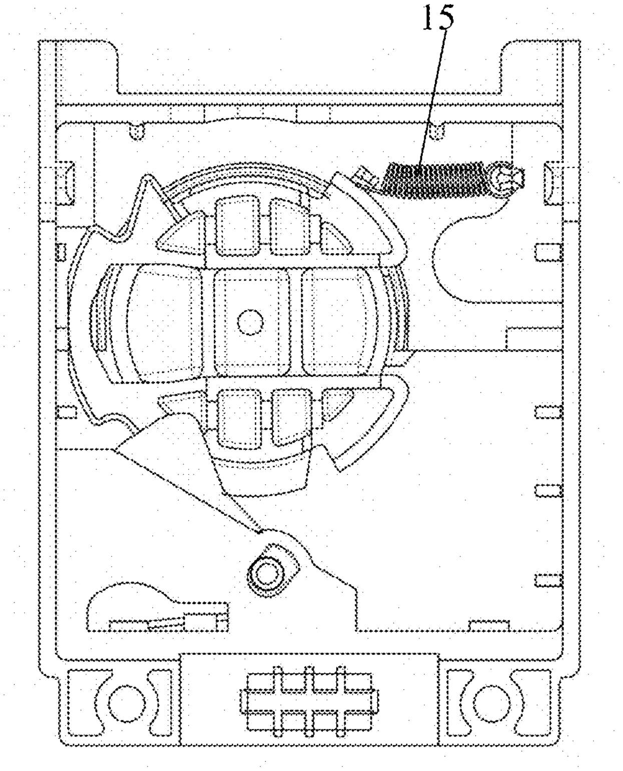
FIG. 8 shows a rear view of the handle of the extension handle assembly rotating from a first position to a second position during a manual tripping period.

The extension handle assembly 1 further includes a stopper 13 disposed in the housing 1, the stopper 13 is pivotally installed in the housing 1, as illustrated by FIG. 4. The stopper 13 includes a pivot shaft 131, a main body 132 and a first stop part 133 protruding from the main body. In the ON state of the motor protection circuit breaker shown in FIGS. 4, 5 and 6, a part of the extension handle assembly 1 abuts against the first stop part 133 of the stopper 13. During a manual tripping period of the motor protection circuit breaker, upon an operation handle 12 rotating from a first position to a second position (counterclockwise in FIG. 4), the handle 12 is stopped by the first stop part 133, which makes it need to increase a rotating force applied to the handle to rotate the handle 12, and further makes the first stop part 133 drive the stopper 13 to pivot around the pivot shaft 131 (clockwise in FIG. 4), so that the stopper 13 finally pivot away from a rotation path of the handle. The rotation of the handle 12 will directly drive the knob 22 of the motor circuit breaker to start rotating, and finally switch the motor circuit breaker from the ON state to the manual tripping state, as illustrated by FIGS. 7 and 8.

The extension handle assembly 1 further includes a return spring 14, which provides a return force for the stopper 13 to return after the stopper 13 is separated from the rotation path of the handle 12. In this example, the return spring 14 is in the form of a torsion spring, but other suitable forms are also possible.

Therefore, by arranging the stopper, the force required by using the extension handle assembly to control the motor protection circuit breaker to switch from the ON state to the manual tripping state can be increased, and the occurrence of accidental switch can be reduced.

Upon a fault tripping occurring, the knob 22 of the motor protection circuit breaker first starts to rotate (which is determined by the operation of the fault tripping of the motor protection circuit breaker and is well known to those skilled in the art), thereby driving the handle 12 of the extension handle assembly to rotate from the first position to the third position.

Figure 9:
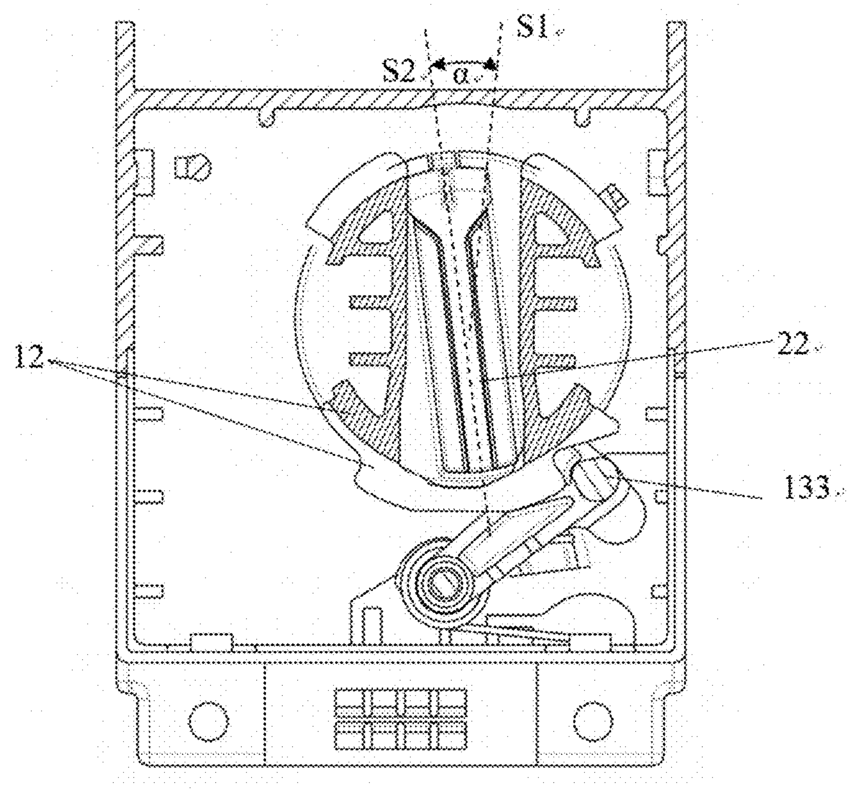
FIG. 9 is a front cross-sectional view showing a state of the knob of the motor protection circuit breaker after being rotated by a predetermined angle and abutting against the handle during a fault tripping period.
Figure 10:
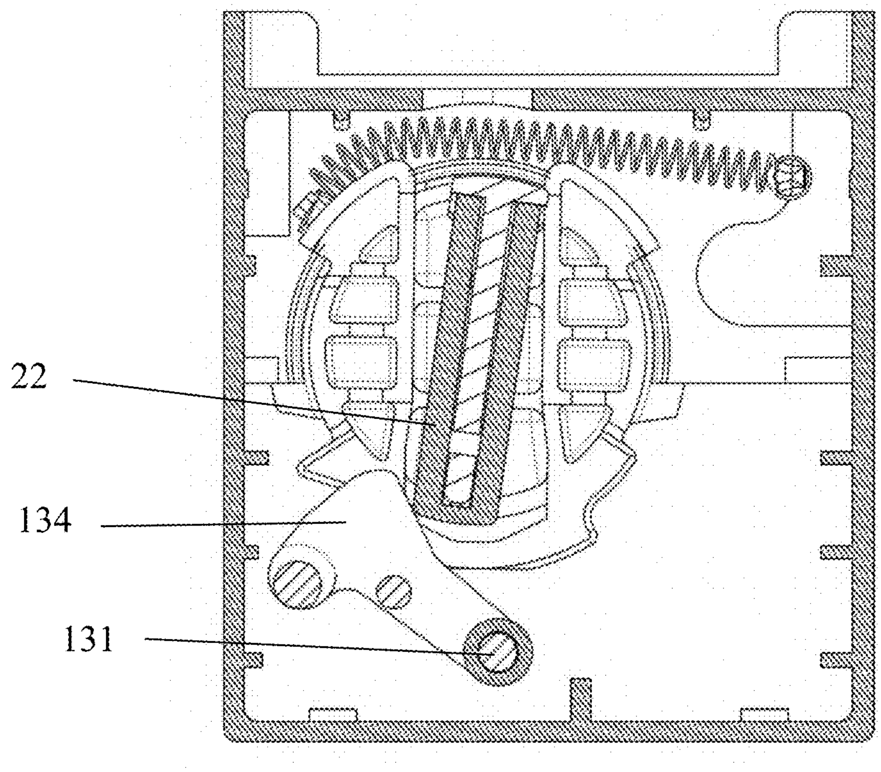
FIG. 10 shows a rear sectional view of the state of FIG. 9.
Figure 11:
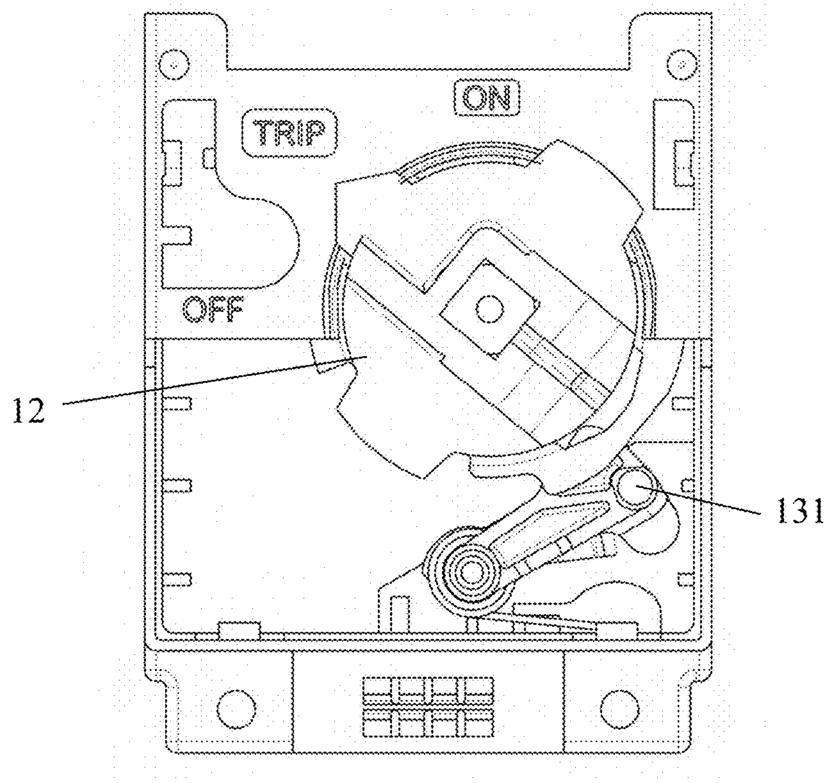
FIG. 11 shows a front view of a knob of the motor protection circuit breaker driving the handle to rotate to the third position after rotating by a predetermined angle during a fault tripping period.
Figure 12:
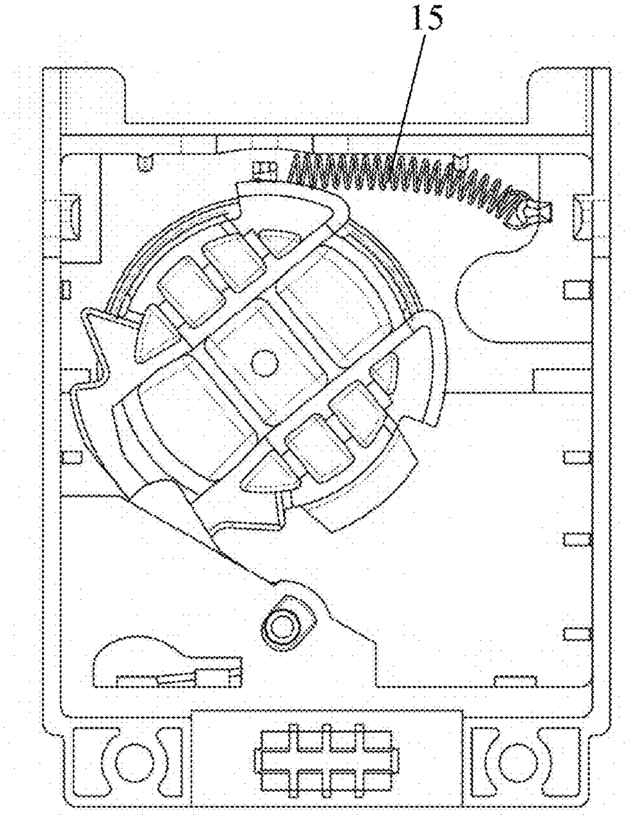
FIG. 12 shows a rear view of a knob of the motor protection circuit breaker reaching the third position during a fault tripping period.

Specifically, upon the fault tripping occurring, in a rotation direction of the knob 22 of the motor protection circuit breaker, the knob 22 and the handle 12 are spaced part by a predetermined angle α. That is to say, the knob 22 needs to rotate by the predetermined angle α, before the knob 22 abuts against the handle 12, and the handle 12 is pushed to rotate together. Referring to the front cross-sectional view of FIG. 9 and the rear cross-sectional view of FIG. 10, FIGS. 9 and 10 both show that the knob 22 of the motor protection circuit breaker abuts against the handle 12 after being rotated counterclockwise by the predetermined angle α. S1 of FIG. 9 represents a position before the knob 22 is rotated, and S2 of FIG. 9 represents a position after the knob 22 is rotated. As a result, upon the knob 22 of the motor protection circuit breaker starting to rotate, due to the existence of the predetermined angle α, the knob 22 will not directly drive the handle 12 to rotate, but will first rotate by a predetermined angle and reach the state shown in FIG. 9 (this process can also be called "idling"). During this period, as illustrated by FIG. 10, a part of the knob 22 will abut against a second stop part 134 of the stopper to push the second stop part 134, so that the second stop part 134 drives the stopper to rotate, so that the first stop part leaves the rotation path of the handle to be rotated later (as illustrated by FIG. 9, the first stop part 131 has left the rotation path of the handle 12, and the handle 12 will not be stopped by the first stop part). From the state of FIG. 9, the knob 22 abuts against the handle 12, so as to drive the handle 12 to rotate in the counterclockwise direction as illustrated by FIG. 9. Because there is no stopper on the rotation path of the handle 12, the rotation of the handle 12 is not stopped at all, and finally rotates to the third position, as illustrated by the front view of FIG. 11 and the back view of FIG. 12.

In addition, the extension handle assembly 1 further includes a biasing member 15 connected between the handle and the housing and configured to provide a biasing force to rotate the handle toward the second position or the third position at the first position of the handle. In an example, the biasing member 15 is in the form of a tension spring. At a first position, as shown most clearly in FIG. 6, the biasing member 15 is in a tension state and stores energy, at this time, the biasing member 15 provides a biasing force to rotate the handle from the first position to the second position or the third position; at the second position shown in FIG. 8, the biasing member 15 is in a state of no energy storage; at the third position shown in FIG. 11, the biasing member 15 is still in a stretched state and stores energy, but compared with FIG. 6, at this time, the biasing member 15 has released some energy.

Through such a biasing member 15, it is beneficial for the handle to rotate from the first position to the second position or the third position more quickly. It will be understood by those skilled in the art that the extension handle assembly 1 further includes locking members for locking the handle 12 at the first position, the second position or the third position, and these locking members are irrelevant to the inventive purpose of the present application, so the relevant description thereof is omitted here.

Through the extension handle assembly including the stopper, the force required by using the extension handle assembly to control the motor protection circuit breaker to switch from the ON state to the manual tripping state can be increased, and the occurrence of accidental switch can be reduced, while the switch of the motor protection circuit breaker from the ON state to the fault tripping state is not hindered.

Moreover, the technical features disclosed above are not limited to the combinations with other features which are disclosed above, and those skilled in the art can also envisage other combinations among the technical features according to the purpose of the present disclosure, so as to achieve the purpose of the present disclosure.

The invention claimed is:

1. An extension handle assembly for a motor protection circuit breaker, wherein the extension handle assembly is installed on the motor protection circuit breaker, wherein the extension handle assembly comprises:

a housing;

a handle, installed to the housing, wherein the handle is installed to a knob of the motor protection circuit breaker upon the extension handle assembly being installed to the motor protection circuit breaker, the handle is configured to drive the knob of the motor protection circuit breaker to rotate together upon the motor protection circuit breaker being manually tripped, and to be driven to rotate together with the knob of the motor protection circuit breaker upon the motor protection circuit breaker being fault-tripped; during a manual tripping period of the motor protection circuit breaker, the handle is configured to drive the knob to rotate from a first position to a second position, during a fault tripping period of the motor protection circuit breaker, the knob is configured to drive the handle to rotate from the first position to a third position, the third position being located between the first position and the second position, wherein at the first position, the motor protection circuit breaker is in an ON state, at the second position, the motor protection circuit breaker is in a manual tripping state, and at the third position, the motor protection circuit breaker is in a fault tripping state;

a stopper, pivotally installed in the housing, wherein the stopper is configured to abut against the handle upon the handle rotating from the first position to the second position during the manual tripping period of the motor protection circuit breaker, so as to provide a stopping force for a rotation of the handle to increase a force required for the rotation of the handle from the first position to the second position, and the stopper is configured not to abut against the handle upon the handle rotating from the first position to the third position during the fault tripping period of the motor protection circuit breaker, so as to not provide a stopping force for the rotation of the handle.

2. A motor protection circuit breaker, wherein the motor protection circuit breaker comprises the extension handle assembly as claimed in claim 1.

3. The extension handle assembly as claimed in claim 1, wherein the stopper comprises a pivot shaft, a main body and a first stop part, and the pivot shaft is installed to the housing so that the stopper pivots around the pivot shaft, and the first stop part protrudes from the main body and is configured to abut against the handle.

4. The extension handle assembly as claimed in claim 3, wherein, upon the handle rotating from the first position to the second position during the manual tripping period of the motor protection circuit breaker, the handle is configured to abut against the first stop part of the stopper, so that the first stop part provides the stopping force to the rotation of the handle and is pushed by the handle to pivot away from a rotation path of the handle.

5. The extension handle assembly as claimed in claim 4, further comprising a return spring arranged between the stopper and the housing, for providing a return force for the stopper to return after the stopper is pushed by the handle to pivot away from the rotation path of the handle.

6. The extension handle assembly as claimed in claim 4, further comprising a biasing member connected between the handle and the housing, wherein the biasing member is configured to provide a biasing force to rotate the handle toward the second position or the third position from the first position of the handle.

7. The extension handle assembly as claimed in claim 6, wherein the biasing member is a tension spring, one end of the tension spring is fixedly installed on the housing, and the other end of the tension spring is fixedly installed on the handle.

8. The extension handle assembly as claimed in claim 4, wherein the knob of the motor protection circuit breaker is spaced apart from the handle by a predetermined angle in a rotation direction of the knob of the motor protection circuit breaker during the fault tripping period of the motor protection circuit breaker.

9. The extension handle assembly as claimed in claim 8, wherein the stopper further comprises a second stop part protruding from the main body and configured to abut against the knob of the motor protection circuit breaker.

10. The extension handle assembly as claimed in claim 9, wherein, during the fault tripping period of the motor protection circuit breaker, the knob of the motor protection circuit breaker is configured to first rotate by a predetermined angle and abut against the second stop part of the stopper to push the stopper to pivot away from the rotation path of the handle, and then the knob abuts against the handle to drive the handle to rotate together with the knob.

* * * * *